(12) United States Patent
Brock et al.

(10) Patent No.: US 9,746,126 B2
(45) Date of Patent: Aug. 29, 2017

(54) HINGE MECHANISM

(71) Applicant: DonMar Industries LLC, Skiatook, OK (US)

(72) Inventors: Donald R Brock, Skiatook, OK (US); Mary Pauline Hamm, Sperry, OK (US)

(73) Assignee: DONMAR INDUSTRIES LLC, Skiatook, OK (US)

( * ) Notice: Subject to any disclaimer, the term of this patent is extended or adjusted under 35 U.S.C. 154(b) by 0 days.

(21) Appl. No.: 15/367,682

(22) Filed: Dec. 2, 2016

(65) Prior Publication Data

US 2017/0167655 A1  Jun. 15, 2017

Related U.S. Application Data

(60) Provisional application No. 62/266,473, filed on Dec. 11, 2015.

(51) Int. Cl.
| | |
|---|---|
| *E05D 7/00* | (2006.01) |
| *E05D 7/12* | (2006.01) |
| *F16M 11/10* | (2006.01) |
| *F16M 11/16* | (2006.01) |
| *F16M 13/02* | (2006.01) |
| *E05D 3/00* | (2006.01) |
| *E05D 7/10* | (2006.01) |
| *E05D 3/02* | (2006.01) |
| *E05D 11/06* | (2006.01) |

(Continued)

(52) U.S. Cl.
CPC .............. *F16M 11/10* (2013.01); *A47C 11/00* (2013.01); *E05D 3/022* (2013.01); *E05D 7/1044* (2013.01); *E05D 11/06* (2013.01); *F16M 13/022* (2013.01); *E05D 7/12* (2013.01); *E05D 11/10* (2013.01); *F16M 11/16* (2013.01)

(58) Field of Classification Search
CPC ........ F16M 11/10; F16M 11/26; F16M 11/16; F16M 13/022; E05D 3/00; E05D 3/02; E05D 7/00; E05D 7/12; E05D 7/1044; E05D 11/06; E05D 11/10
USPC ............ 248/122.1, 124.1, 125.7, 166, 219.2; 16/221
See application file for complete search history.

(56) References Cited

U.S. PATENT DOCUMENTS 3,804,355 A * 4/1974 Uroshevich ............ F16M 11/16
248/124.1
5,058,498 A * 10/1991 Chen ......................... B30B 1/04
100/245

(Continued)

*Primary Examiner* — Tan Le

(57) ABSTRACT

A hinge mechanism rotatably joins a post and a hinge in a manner that allows for rapid assembly and disassembly. A first stop, second stop, and third stop are used to create a gravity-assisted rotation system for the hinge mechanism, with the hinge rotating between a horizontal locked position, raised unlocked position, and rotated collapsed position. A pin is placed through corresponding pin receptacles of the post and the hinge in order to secure the two together. The pin is locked within the post by a locking member, which secures the pin in a manner that facilitates easy pin insertion and removal. The hinge mechanism can be integrated into a variety of apparatuses, such as a table with rotating top; the top can be rotated to the collapsed configuration in order to serve as a seat back or left in the locked configuration to be used as a table top.

8 Claims, 24 Drawing Sheets

(51) Int. Cl.
    *A47C 11/00* (2006.01)
    *E05D 11/10* (2006.01)

(56) References Cited

U.S. PATENT DOCUMENTS

| | | | | |
|---|---|---|---|---|
| 5,217,344 | A * | 6/1993 | Gendrault | B25J 5/007 |
| | | | | 212/176 |
| 5,833,215 | A * | 11/1998 | Vandenburg | E04H 17/265 |
| | | | | 254/30 |
| 6,076,787 | A * | 6/2000 | Troyer | A47B 23/04 |
| | | | | 248/166 |
| 6,089,524 | A * | 7/2000 | Lai | A01K 97/10 |
| | | | | 248/535 |
| 6,394,401 | B1 * | 5/2002 | St. Peter | A01G 5/02 |
| | | | | 248/122.1 |
| 6,646,557 | B2 * | 11/2003 | Brake | A01K 97/125 |
| | | | | 340/573.2 |
| 7,125,000 | B1 * | 10/2006 | Saavedra | E04H 17/265 |
| | | | | 254/30 |
| 9,220,252 | B1 * | 12/2015 | Arcabascio | A01K 97/10 |

* cited by examiner

HINGE MECHANISM

The current application claims a priority to the U.S. Provisional Patent application Ser. No. 62/266,473 filed on Dec. 11, 2015.

FIELD OF THE INVENTION

The present invention relates generally to a hinge mechanism which can quickly be rotated between two or more secure states, and be disassembled and made portable, without the need for specialized tools.

BACKGROUND OF THE INVENTION

Hinges have been purpose designed for a variety of applications, with different configurations and corresponding tradeoffs addressing certain problems at the expense of others. Many hinges are freely rotatable, while others provide a means to secure the hinge in one or more positions. The present invention falls into the latter category, introducing a hinge which can rotatable couple two objects in a manner that allows for locking of the hinge in a user-selected configuration. The hinge described by the present invention describes a tool-free locking means, creating an efficient hinge mechanism suitable for use across a variety of fields.

The purpose of the hinge is to be portable and able to be broken down with one removable pin located at the pivot point. It also has the ability to lock a surface in a horizontal position using leverage and gravity to hold the surface in position. It further has the ability to disassembled or reassembled rapidly, with disassembly times of only a few seconds.

DETAIL DESCRIPTIONS OF THE INVENTION

All illustrations of the drawings are for the purpose of describing selected versions of the present invention and are not intended to limit the scope of the present invention.

The present invention is a hinge mechanism that allows for two components to easily be rotated relative to one another. The present invention also facilitates quick coupling and decoupling between components. The present invention is beneficial in a variety of applications; as one example, the present invention could be used to join a table top to a table bench; the hinge mechanism can then allow the table top to rotate relative to the table bench. When rotated to a vertical position, the table top then is able to serve as a back rest for the table top. While the present invention is described in relation to this specific application, the present invention may be used in any situation that calls for rotatably coupling two components to each other.

Figure 1:
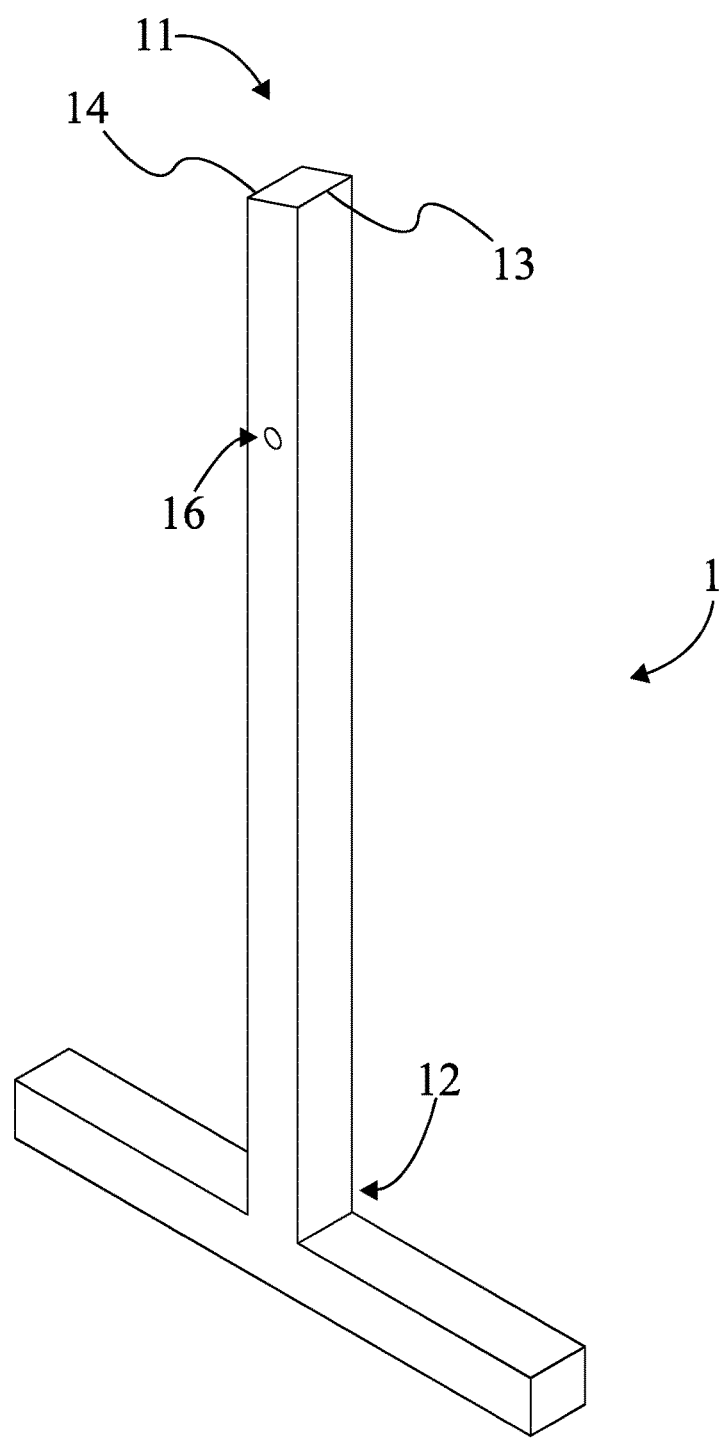
FIG. 1 is a perspective view of a post of the present invention.
Figure 2:
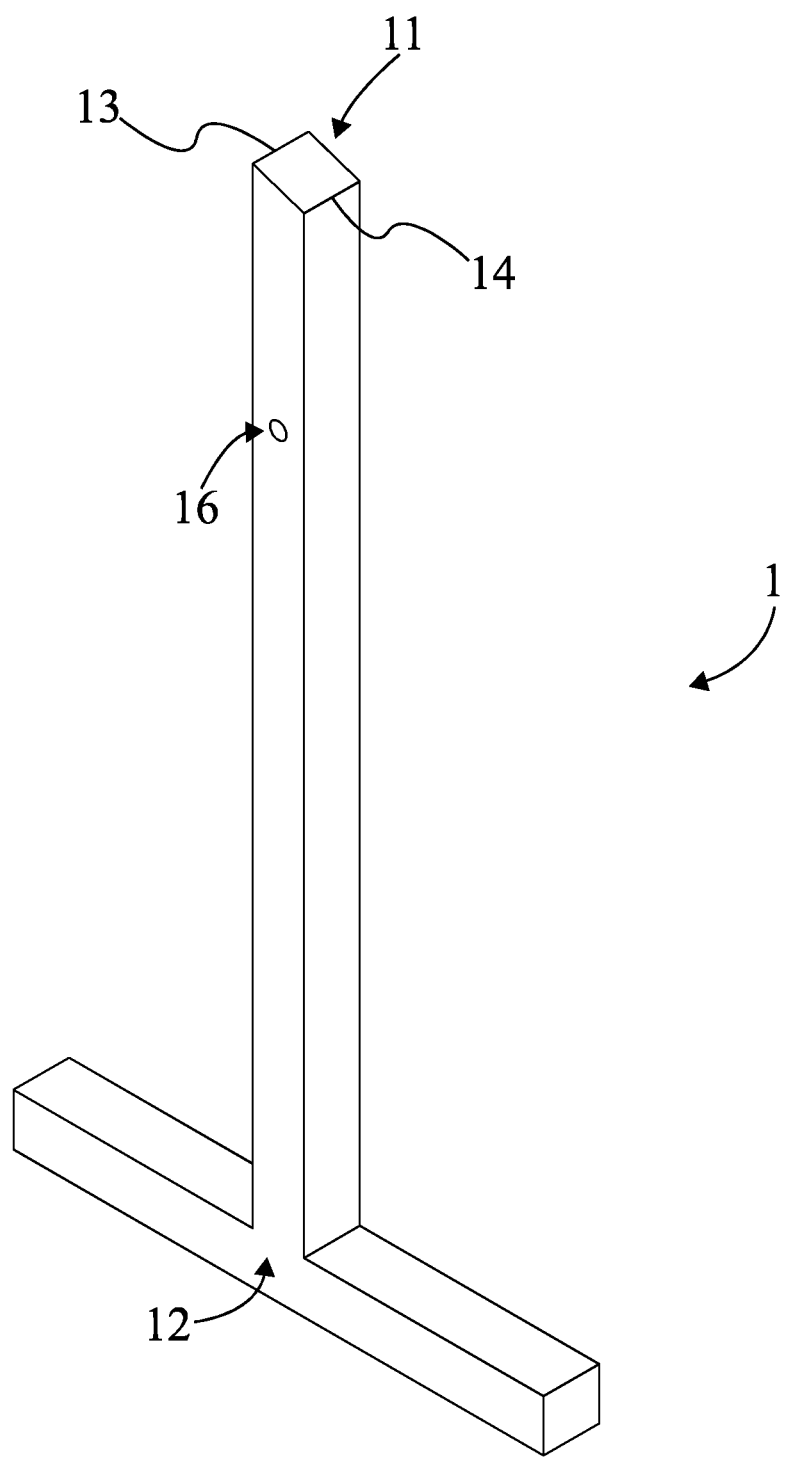
FIG. 2 is another perspective view of the post of the present invention.
Figure 3:
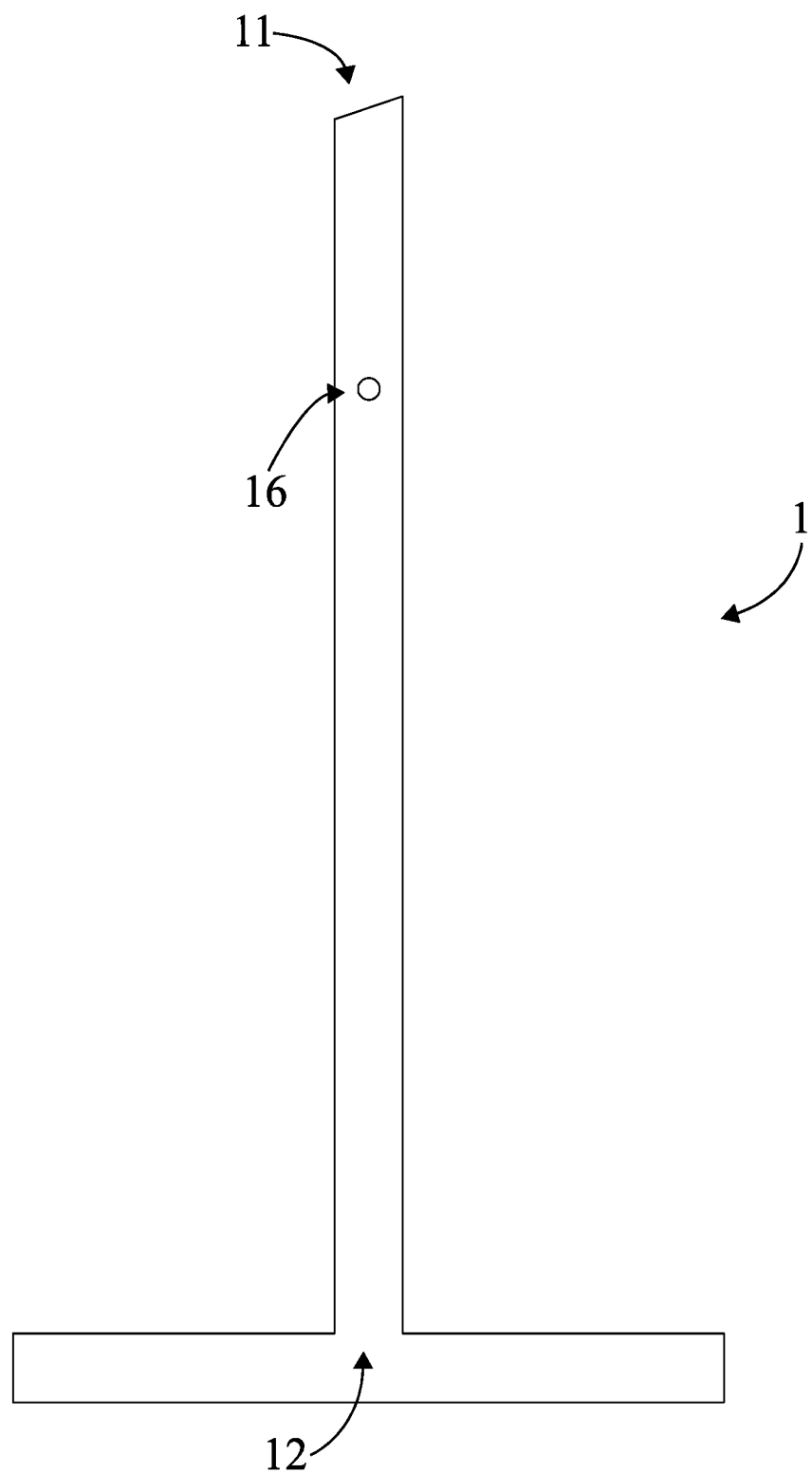
FIG. 3 is a right side view of the post of the present invention.
Figure 4:
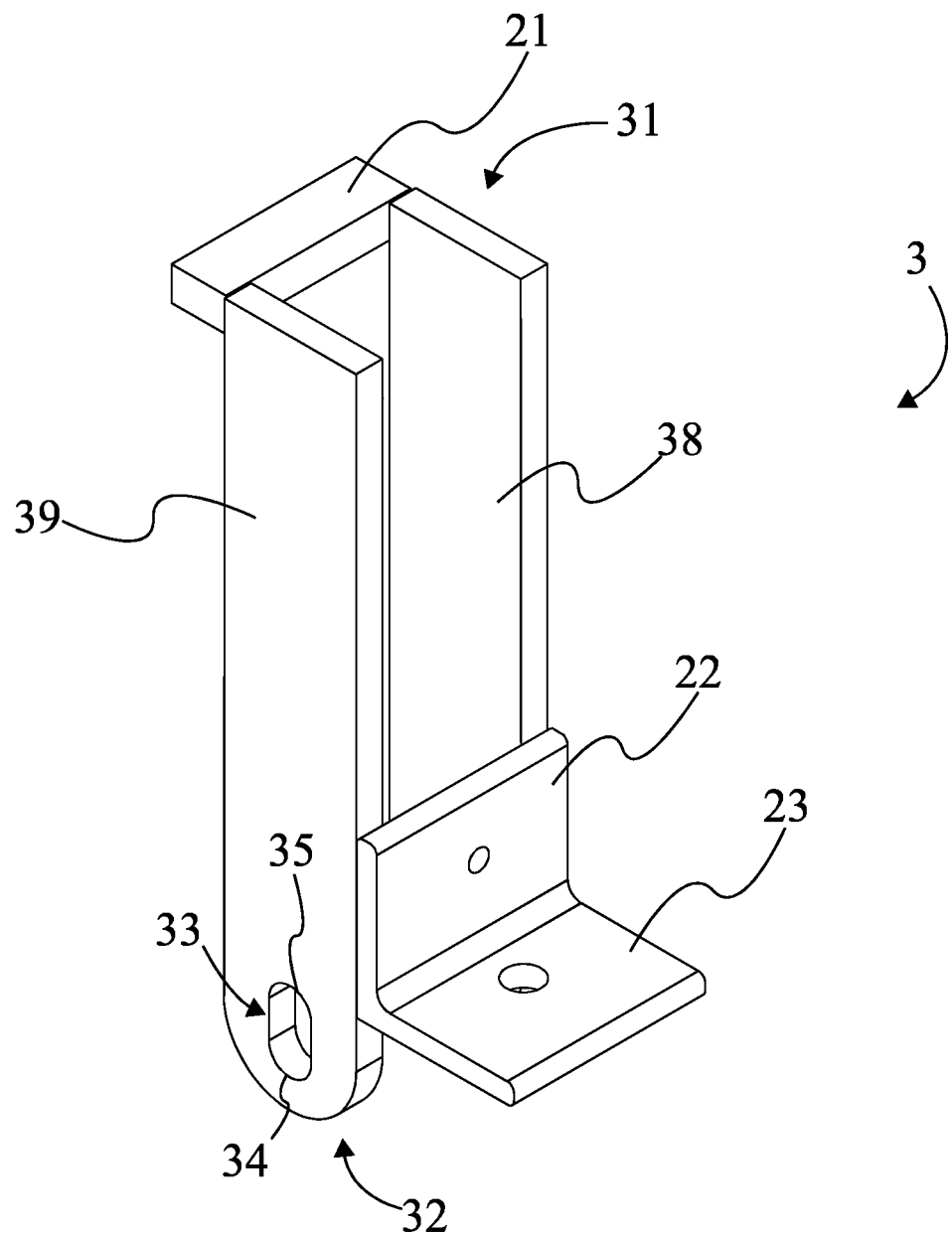
FIG. 4 is a perspective view of a hinge of the present invention.
Figure 5:
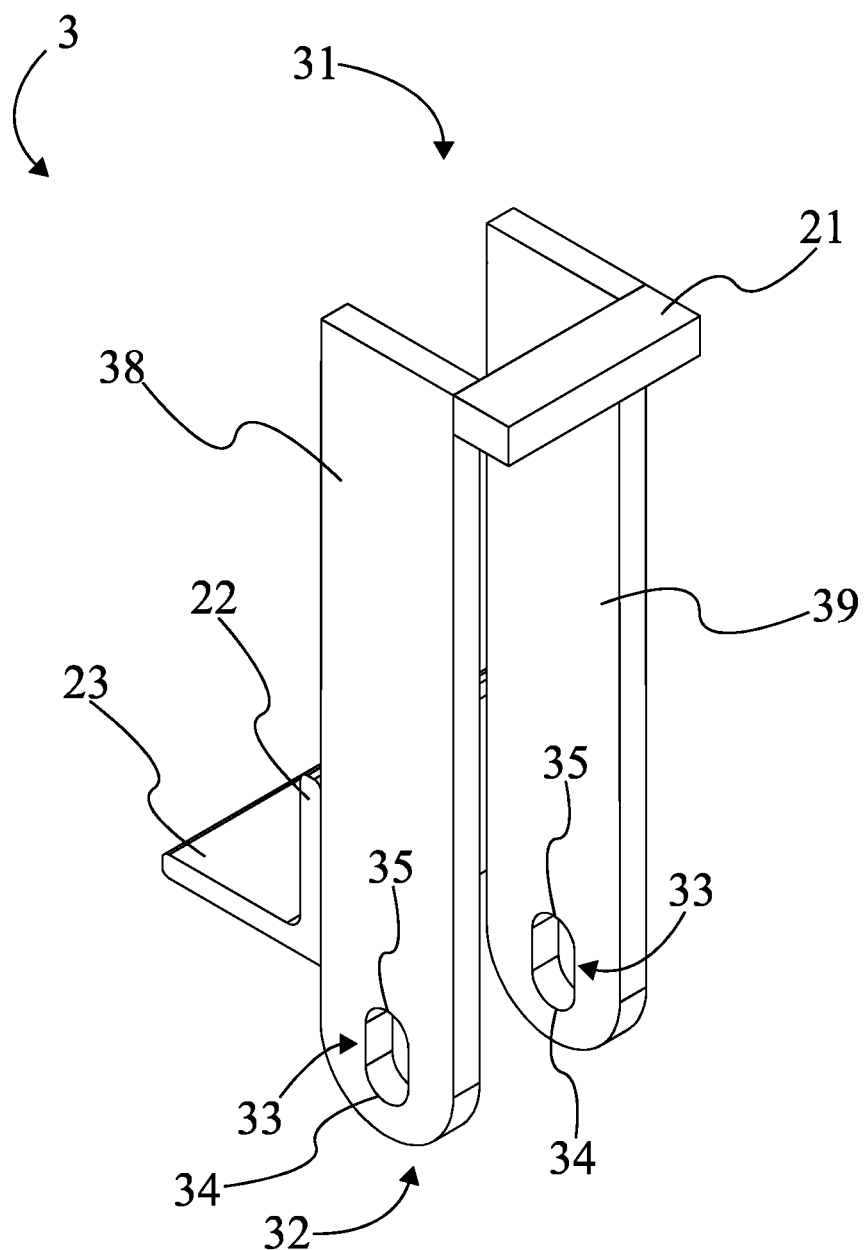
FIG. 5 is another perspective view of the hinge of the present invention.
Figure 6:
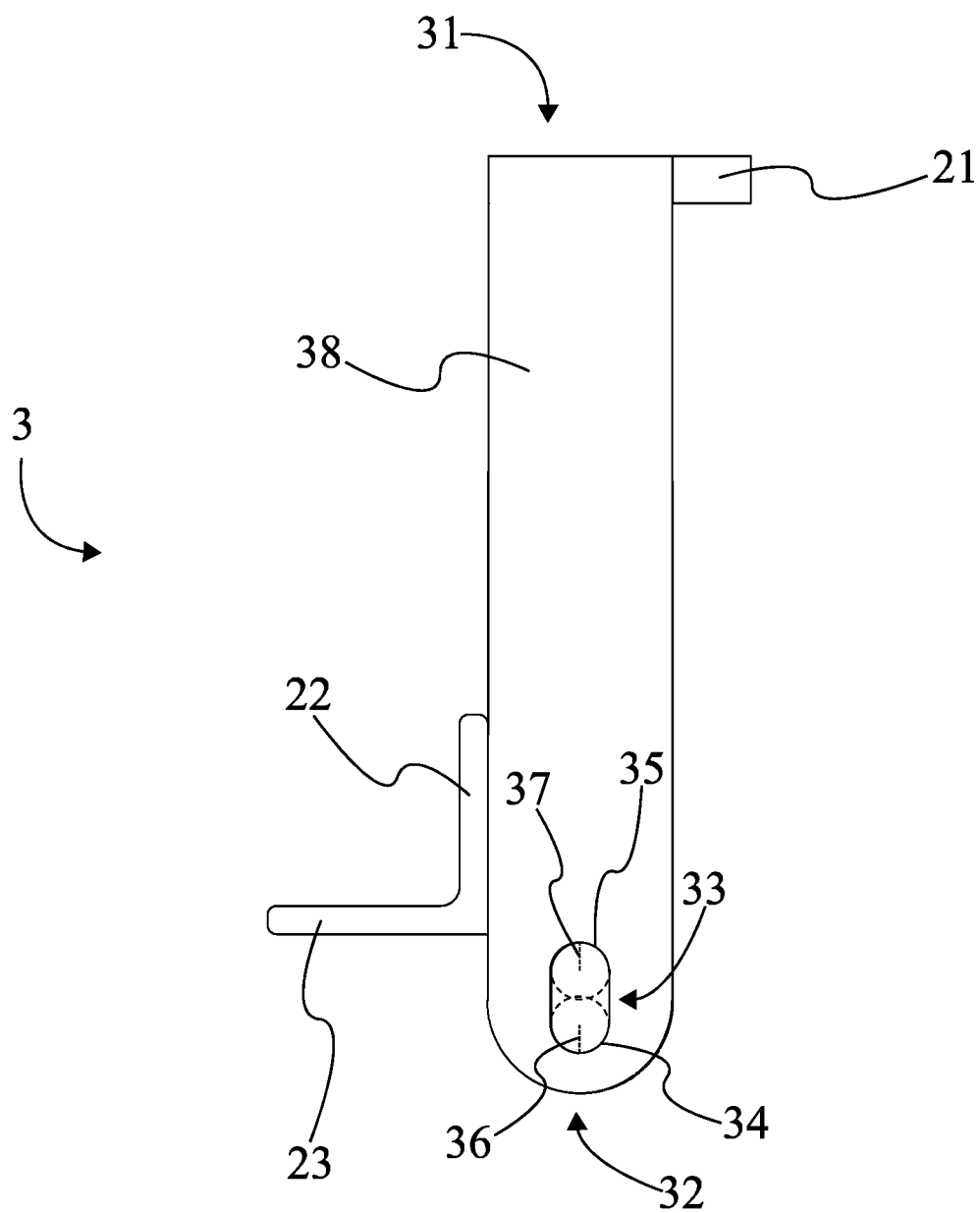
FIG. 6 is a right side view of the hinge of the present invention.
Figure 7:
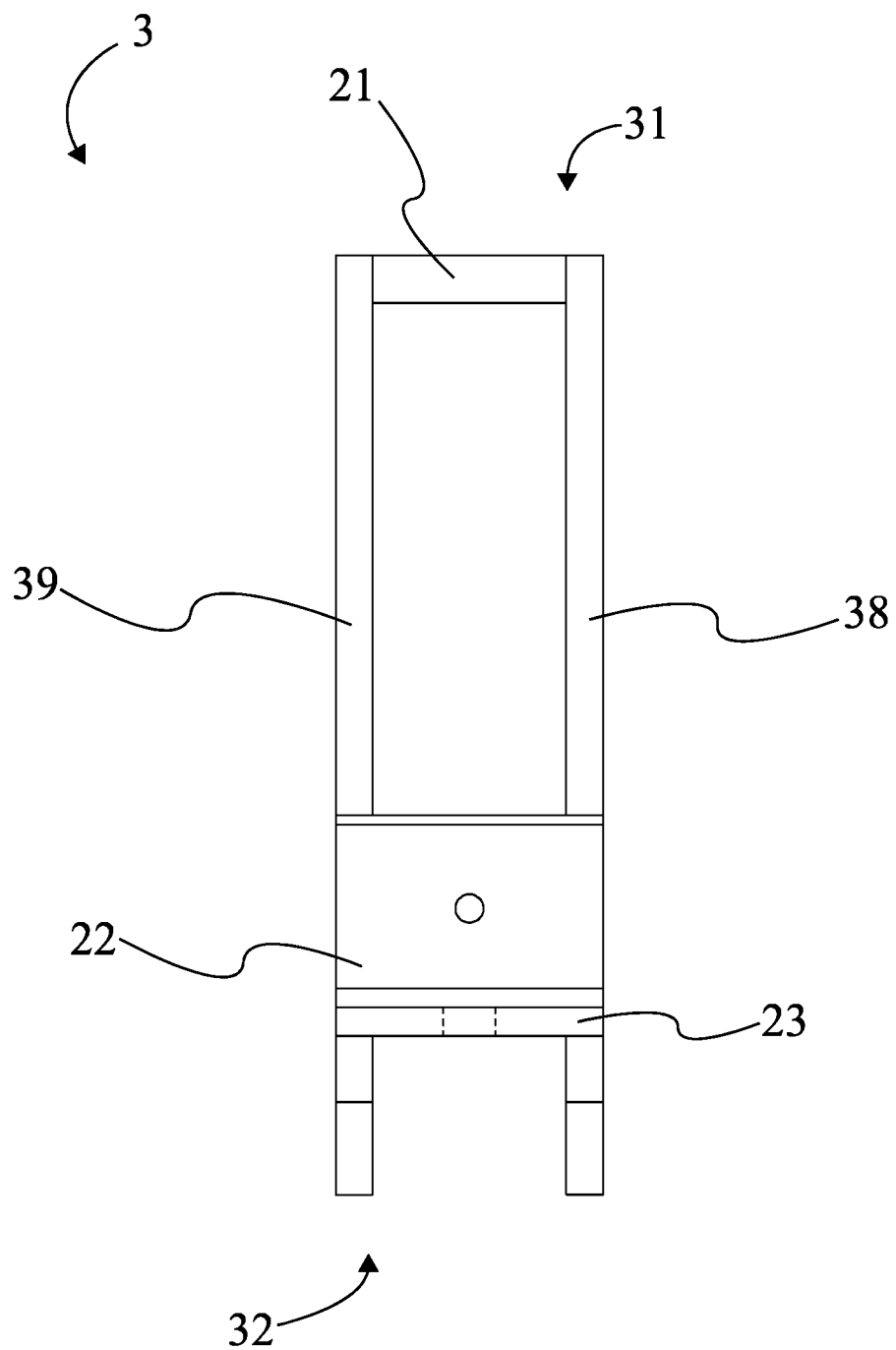
FIG. 7 is a front view of the hinge of the present invention.

The present invention comprises a post 1, a first stop 21, a second stop 22, and a hinge 3. The hinge 3 rotates relative to the post 1, while the first stop 21 and the second stop 22 secure the hinge 3 in a user-selected configuration. The post 1 comprises a beveled end 11 and a fixed end 12. The beveled end 11 itself comprises an upper edge 13 and a lower edge 14. The upper edge 13 and lower edge 14, in combination with the first stop 21, block rotation of the hinge 3 in one direction while allowing rotation of the hinge 3 in an opposite direction. The fixed end 12 allows for the present invention to be connected to an external surface or body, enabling use of the present invention in a variety of applications where a hinge is needed. The post 1 is shown in FIG. 1-FIG. 3, while the first stop 21, second stop 22, and hinge 3 are shown in FIG. 4-FIG. 7.

The upper edge 13 and the lower edge 14 are positioned opposite each other across the beveled end 13. As shown in FIG. 1 and FIG. 2, the upper edge 13 is placed at a rear surface of the post 1 while the lower edge 14 is positioned at a front surface of the post 1. Additionally, both these edges are parallel with a rotational axis 4. The rotational axis 4, defined in more detail later, laterally traverses through the base end 32 of the hinge 3.

In reference to FIG. 4-7, the hinge 3 comprises a pivoting end 31 and a base end 32. The hinge 3 is rotatably joined with the post 1 at the base end 32, while the pivoting end 31 is free to rotate, as depicted between FIG. 10 and FIG. 12. Further, external components or apparatuses can be connected to the pivoting end 31 as necessary for a specific hinge application. Returning to the earlier table example, a mounting plate can be connected to the pivoting end 31, while the fixed end 12 of the post can be mounted to a foot of the table. Resultantly, the present invention, by means of the post 1 and the hinge 3, allows for the table top to rotate relative to a table bench.

To enable rotation, the post 1 is positioned into the hinge 3, resulting in a rotatable coupling between the two components. The pivoting end 31 is rotatably mounted to the post 1, offset from the beveled end 11. This allows the pivoting end 31 to move along a circular path relative to the post 1. The pivoting end 31 is also slidably mounted along the post 1, such that a user is able to raise or lower the hinge 3 relative to the post 1, as depicted between FIG. 8 and FIG. 10. The ability to linearly move the hinge 3, in combination with the rotational movement, allows for rapid and tool-free adjustment of the present invention.

The first stop 21 is positioned adjacent to the hinge 3, near the top of the hinge 3. The second stop 22 is conversely positioned adjacent to the hinge 3, near the bottom of the hinge 3, opposite to the first stop 21. Further, the first stop 21 is connected across the hinge 3 adjacent to the pivoting end 31 while the second stop 22 is connected across the hinge 3 offset from the base end 32. Put more simply, the first stop 21 is placed at the pivoting end 31 (i.e. a top of the hinge 3) while the second stop 22 is placed at the base end 32 (i.e. a bottom of the hinge 3). This arrangement is most clearly shown in FIG. 4-FIG. 6.

Figure 21:
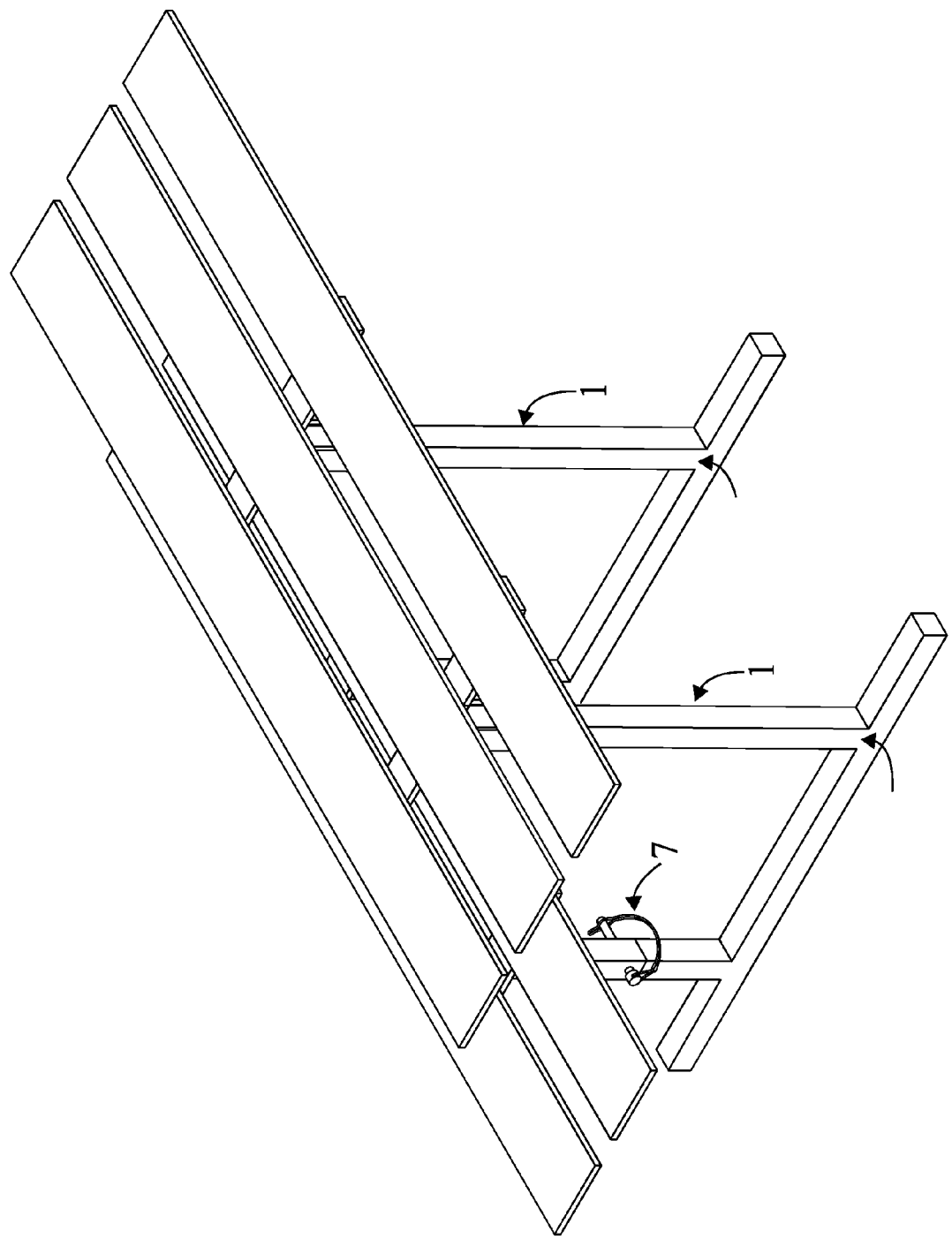
FIG. 21 is a perspective view showing the present invention installed in a table bench combination in the locked configuration.
Figure 22:
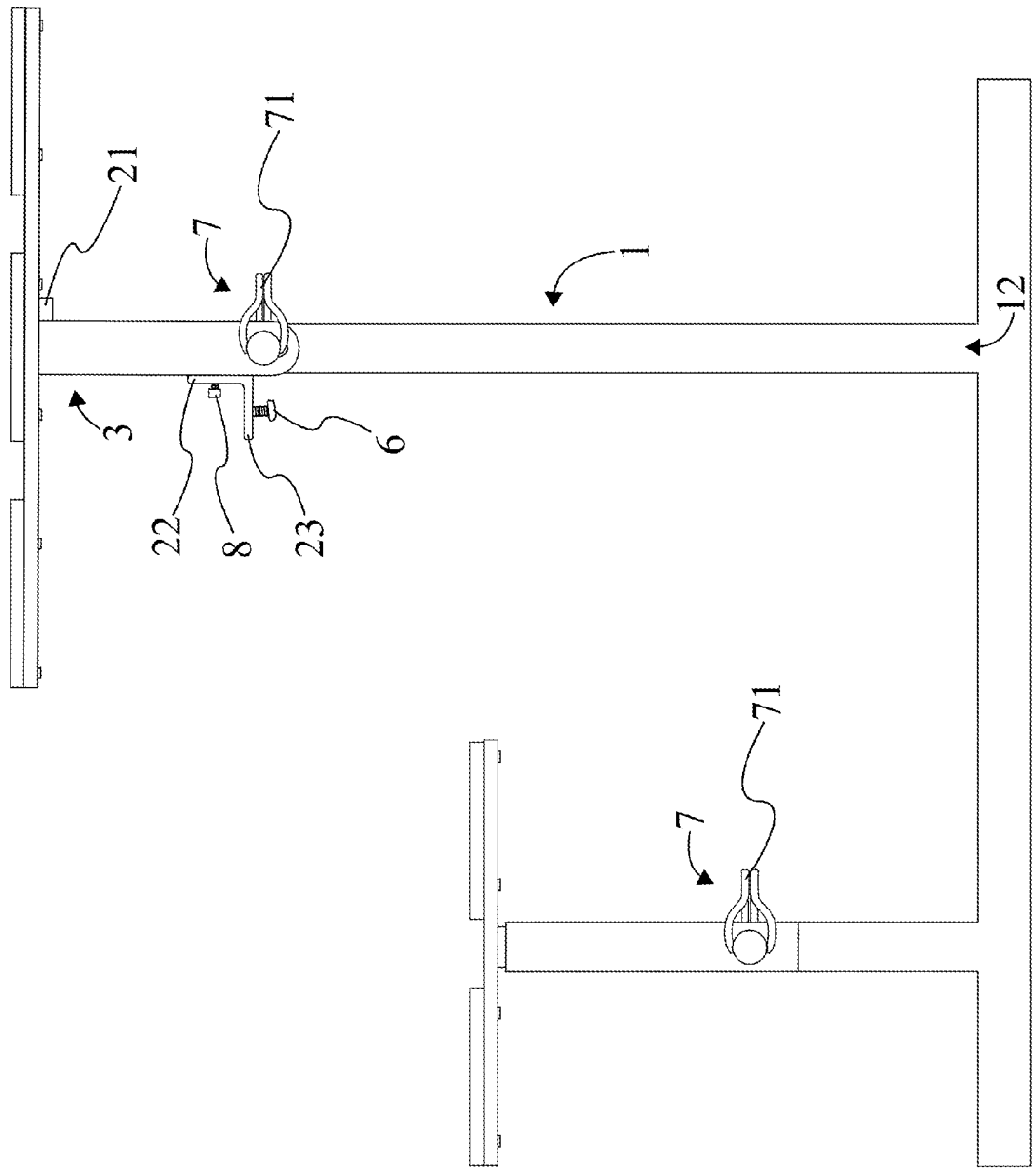
FIG. 22 is a front view showing the present invention installed in the table bench combination in the locked configuration.
Figure 23:
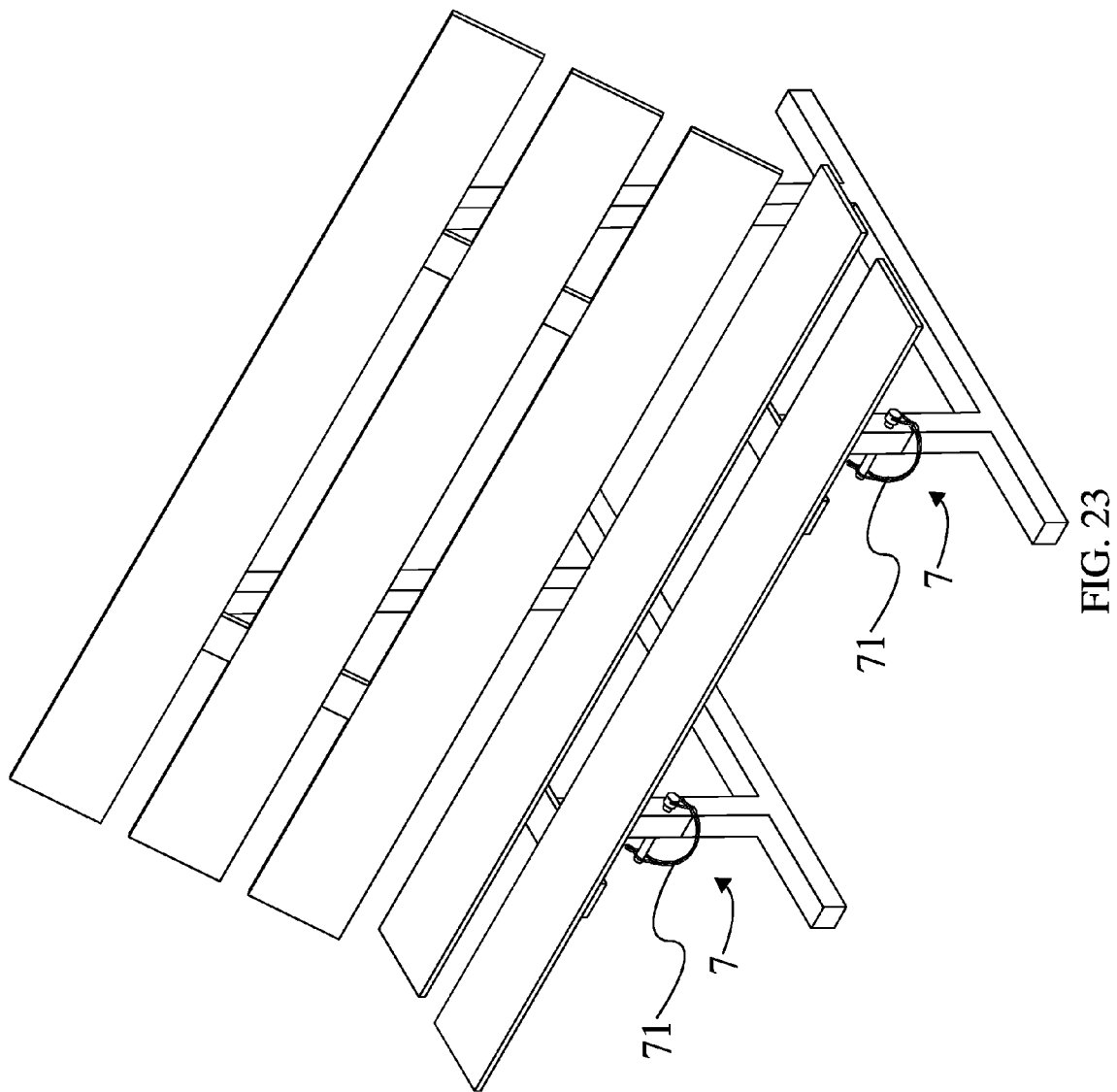
FIG. 23 is a perspective view showing the present invention installed in the table bench in the collapsed configuration.
Figure 24:
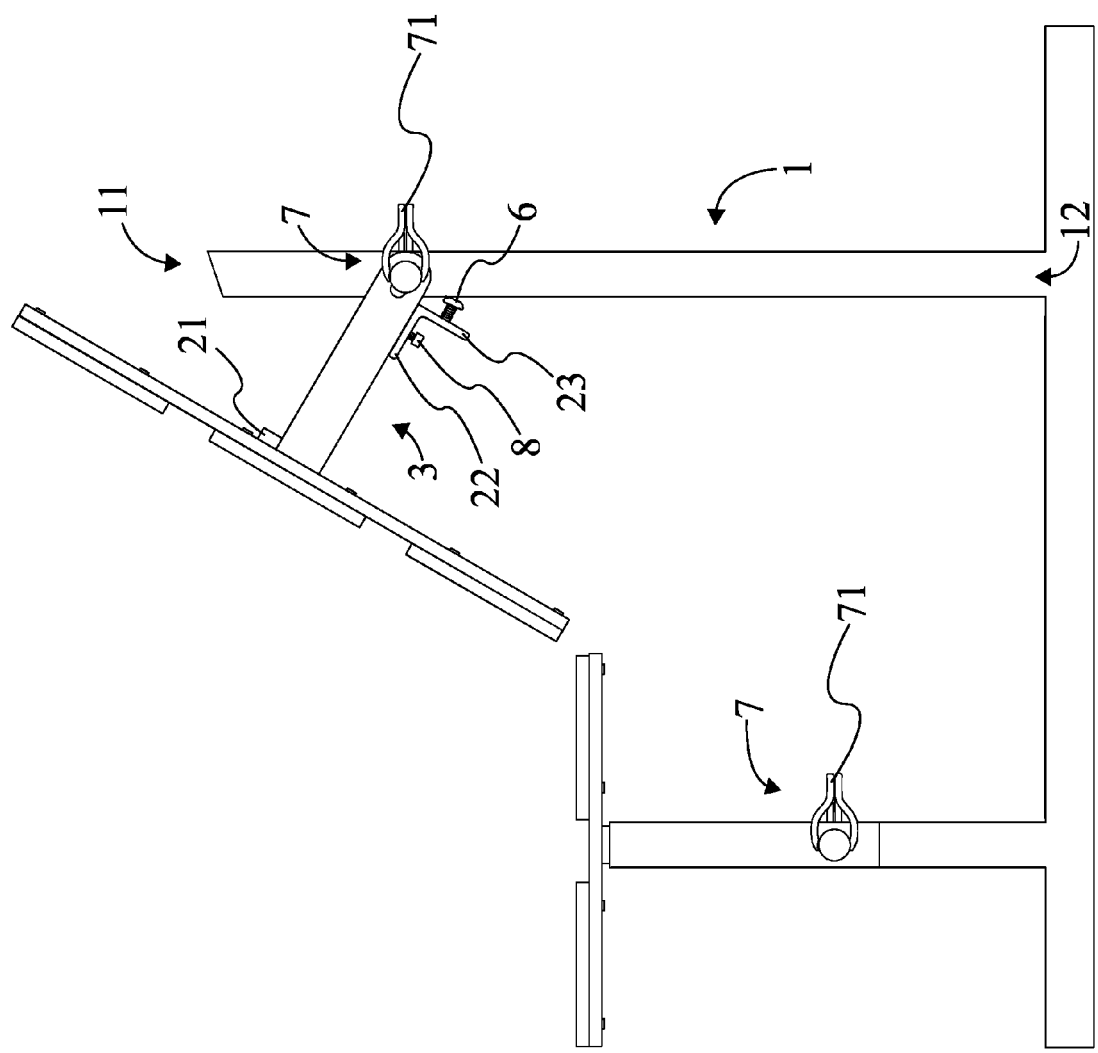
FIG. 24 is a front view showing the present invention installed in the table bench in the collapsed configuration.

The present invention, as heretofore described, allows a user to select a state for the present invention, the state comprising a locked configuration 51, an unlocked configuration 52, and a collapsed configuration 53. In the earlier example of a table using the present invention, the locked configuration 51 corresponds to the table top being generally horizontal, as depicted in FIG. 21-22; the collapsed configuration 53 corresponds to the table top being generally vertical (suitable for use as a back rest), as depicted in FIG. 23-24; and the unlocked configuration 52 corresponds to a position in which the tabletop can be rotated between the locked configuration 51 and the collapsed configuration 53.

Figure 8:
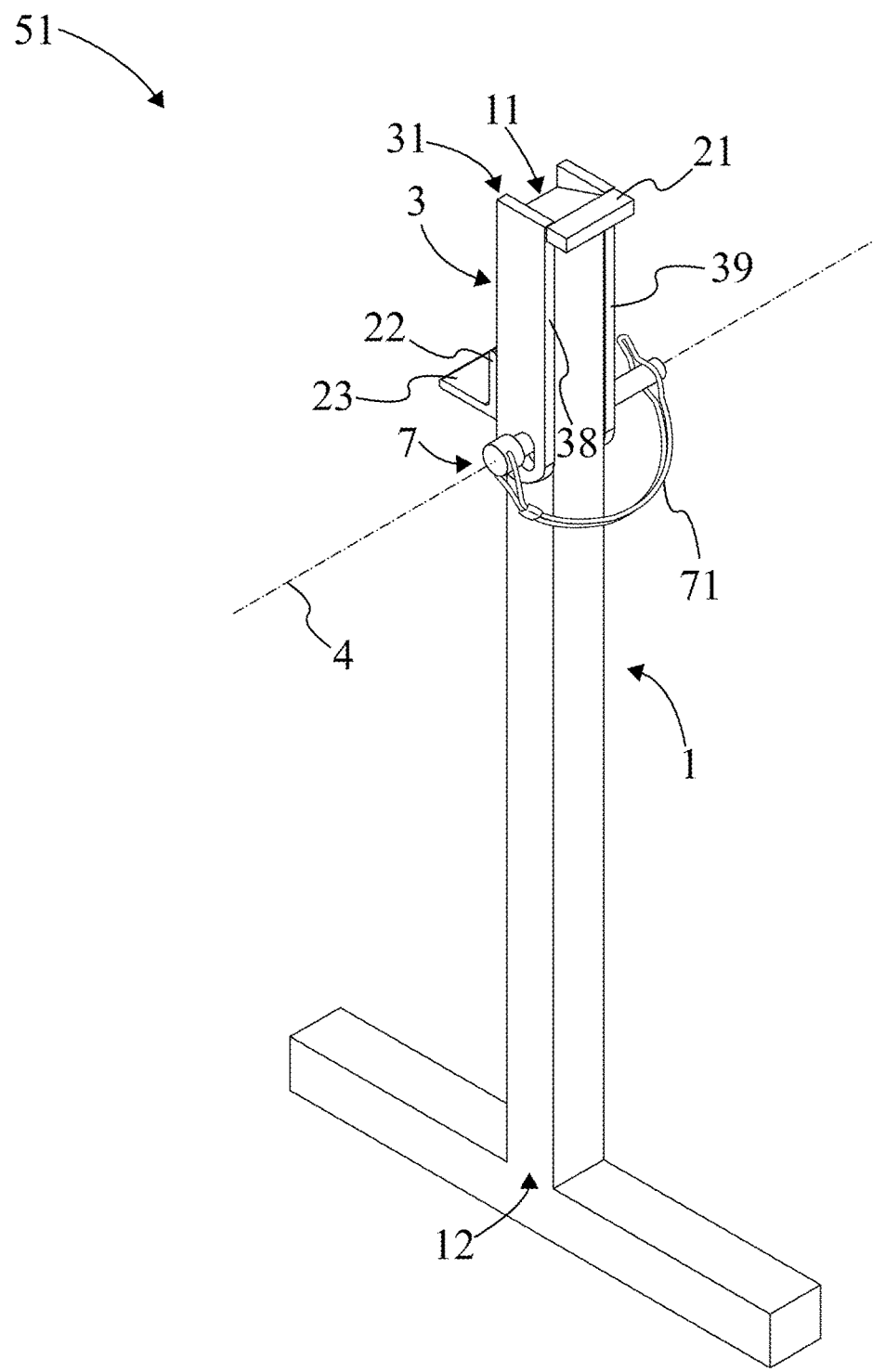
FIG. 8 is a perspective view showing the present invention in a locked configuration.
Figure 9:
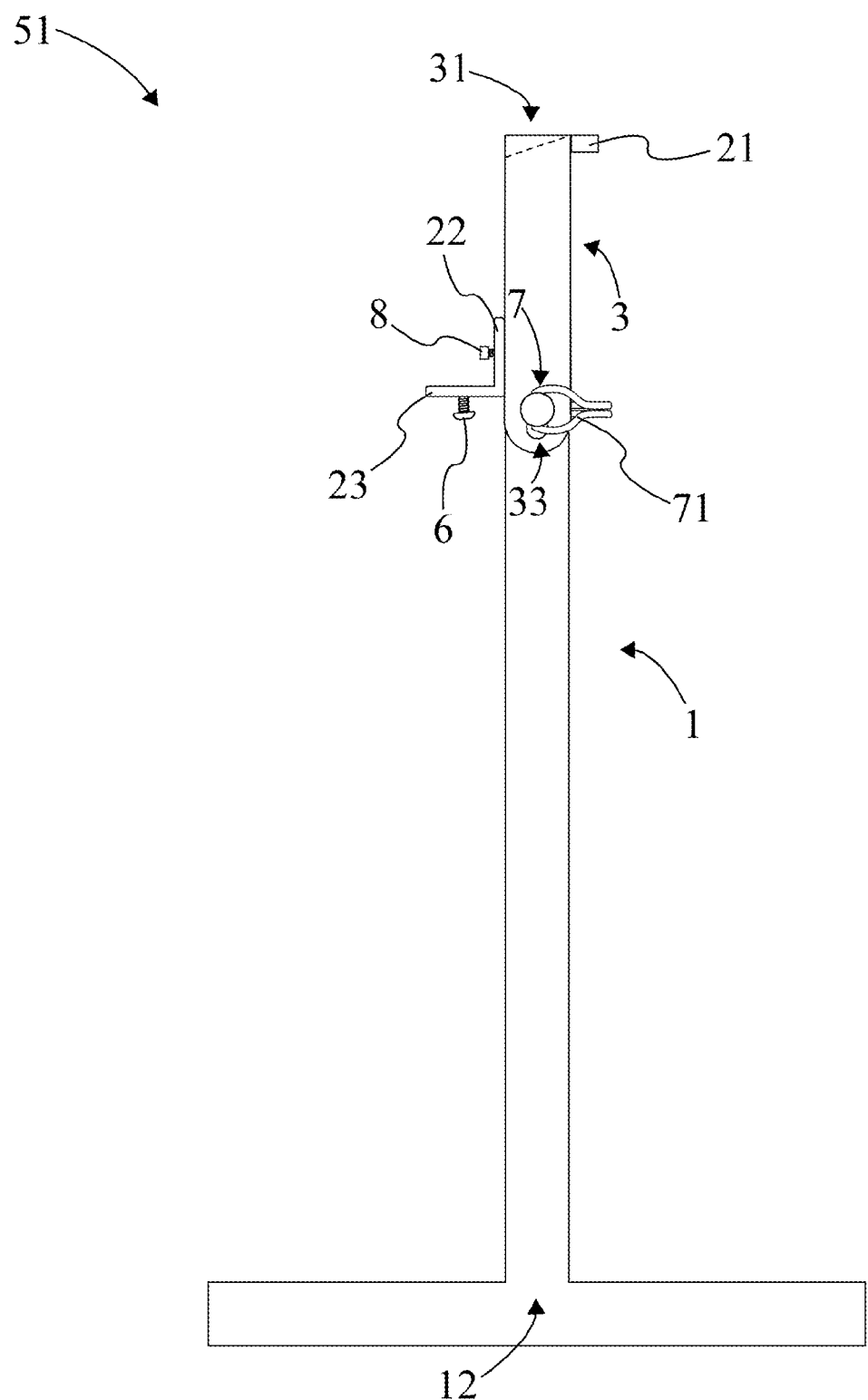
FIG. 9 is a front view showing the present invention in the locked configuration.

In reference to FIG. 8-9, in the locked configuration 51, the first stop 21 engages with the beveled end 11 of the post 1 to secure the hinge 3 in an upright orientation. When a mounting plate is connected, a table top can thus be secured in a flat position. In this configuration, the lower edge 14 is positioned adjacent to the second stop 22, where the post 1 is laterally pressed against the second stop 22. Resultantly, the second stop 22 prevents the hinge 3 from rotating in a first direction, i.e. rearwards as shown in FIG. 8-9. Conversely, the first stop 21 prevents the hinge 3 from rotating in an opposite direction (i.e. forwards) thanks to the upper edge 13 being pressed against the first stop 21. The first stop 21 and the second stop 22 thus serve to secure the hinge 3 in a vertical position relative to the post 1. Rotational movement is prevented thanks to the hinge 3 effectively being braced between the first stop 21 and the second stop 22. The locked configuration 51 is shown in FIG. 8 and FIG. 9.

In order to transition from the locked configuration 51 to the collapsed configuration 53, a user must first adjust the present invention to the unlocked configuration 52. In reference to FIG. 10-11, in the unlocked configuration 52, the lower edge 14 is again positioned adjacent to the second stop 22, with the post 1 laterally pressing against the second stop 22. Resultantly, the second stop 22 blocks the hinge 3 from rotating in the first direction, preventing the hinge 3 from falling backwards. The first stop 21 is raised, compared to the locked configuration 51, such that the upper edge 13 is offset from the first stop 21. The first stop 21 can be raised thanks to the slidable engagement between the post 1 and the hinge 3. Effectively, raising the hinge 3 provides enough clearance between the first stop 21 and the upper edge 13 to allow the hinge 3 to be rotated forward in a second direction. Thanks to the beveled edge 11, a user only needs to raise the hinge 3 to a height sufficient to clear the upper edge 13. The lower edge 14 is positioned low enough that it falls within the arc of a circle with a center at the rotational axis 4 and a radius equal to the distance between the rotational axis 4 and the upper edge 13. A visual illustration of the unlocked configuration is provided through FIG. 10 and FIG. 11.

After being transitioned from the locked configuration 51 to the unlocked configuration 52, a user can then move the present invention into the collapsed configuration 53. A user does so by rotating the hinge 3 forwards in the second direction. To limit the forward rotation of the hinge 3, a third stop 23 is provided. The third stop 23 is connected perpendicular and adjacent to the second stop 22, opposite the hinge 3. Resultantly, the post 3 laterally presses against the third stop 23. Thanks to the force of gravity, which pulls down on the hinge 3, an additional physical stop is not needed to prevent forwards rotation of the hinge 3. The weight of the hinge 3 is sufficient to prevent forward rotation, thus securely positioning the hinge 3 in combination with the third stop 23. In short, the present invention uses the force of gravity to assist a user with rotating the present invention between the locked configuration 51 and the collapsed configuration 53, as well as to secure the present invention in the collapsed configuration 53. The collapsed configuration 53 is illustrated via FIG. 12 and FIG. 13.

A number of embodiments, derived from the present invention as described above, are possible. For example, it may be desirable for a user to be able to adjust an angle between the hinge 3 and the post 1 in the collapsed configuration 53; as described, the collapsed configuration 53 only allows for a set angle (for example a ninety-degree right angle) between the hinge 3 and the post 1. In an embodiment that allows for the angle to be adjusted, the present invention further comprises a bracing member 6. The bracing member 6 is oriented to be normal to the third stop 23, with the bracing member 6 traversing through the third stop 23. The bracing member 6 extends from the third stop 23, such that the post 1 encounters the bracing member 6 before reaching a ninety-degree angle. Further, as the bracing member 6 is threadibly engaged with the third stop 23, the extension of the bracing member 6 from the third stop 23 can easily be adjusted. For easy user engagement, the bracing member 6 may be a thumb screw that can quickly be screwed into or out of the third stop 23. An illustration demonstrating the potential bracing member 6 is shown via FIG. 13 and FIG. 14, which show how different angles are enabled by the bracing member 6.

Figure 15:
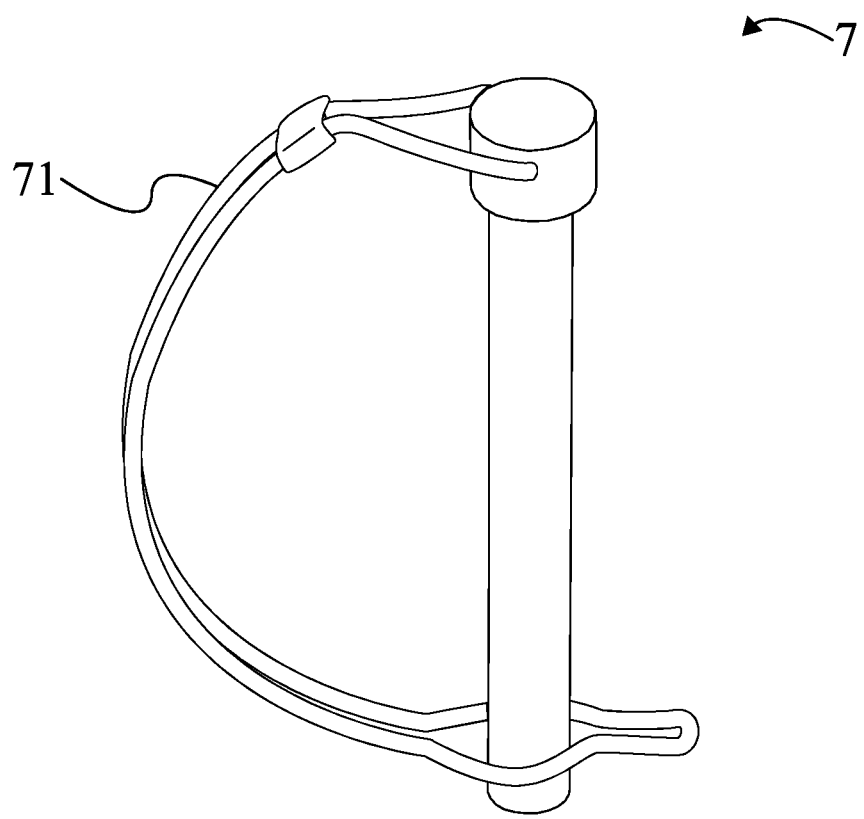
FIG. 15 is a perspective view showing a pin of the present invention.
Figure 16:
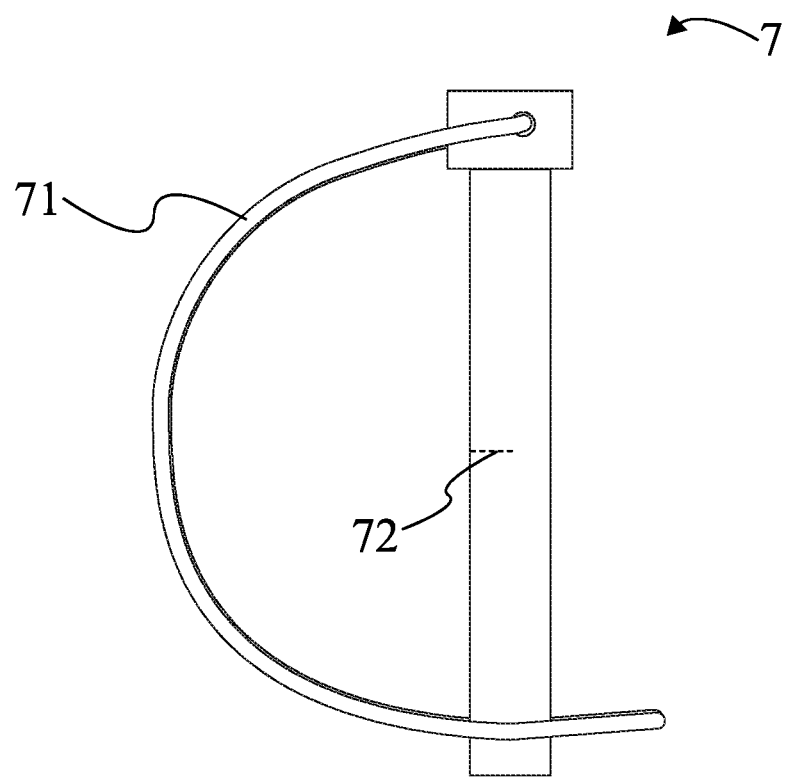
FIG. 16 is a right side view of the pin of the present invention.
Figure 17:
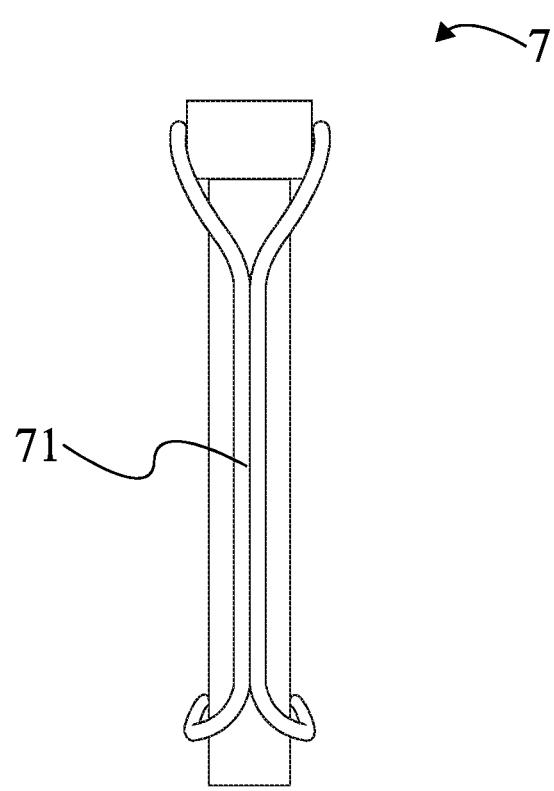
FIG. 17 is a front view of the pin of the present invention.
Figure 18:
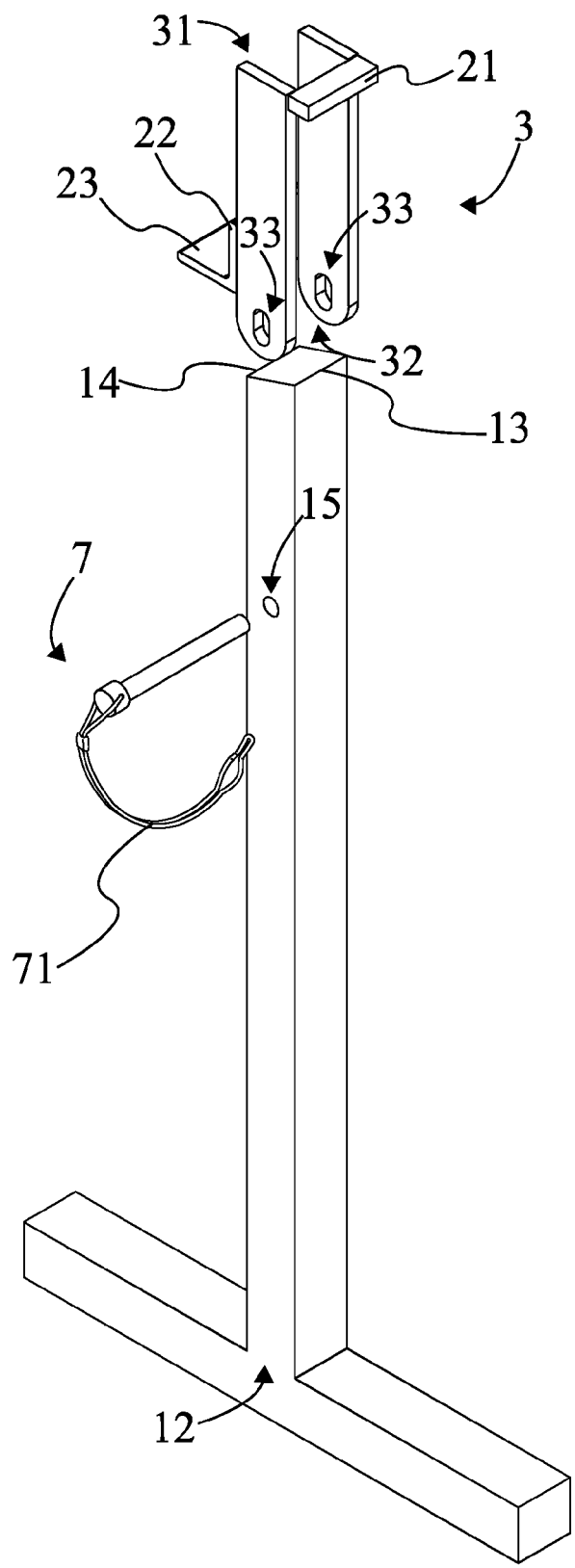
FIG. 18 is an exploded perspective view of the present invention.
Figure 19:
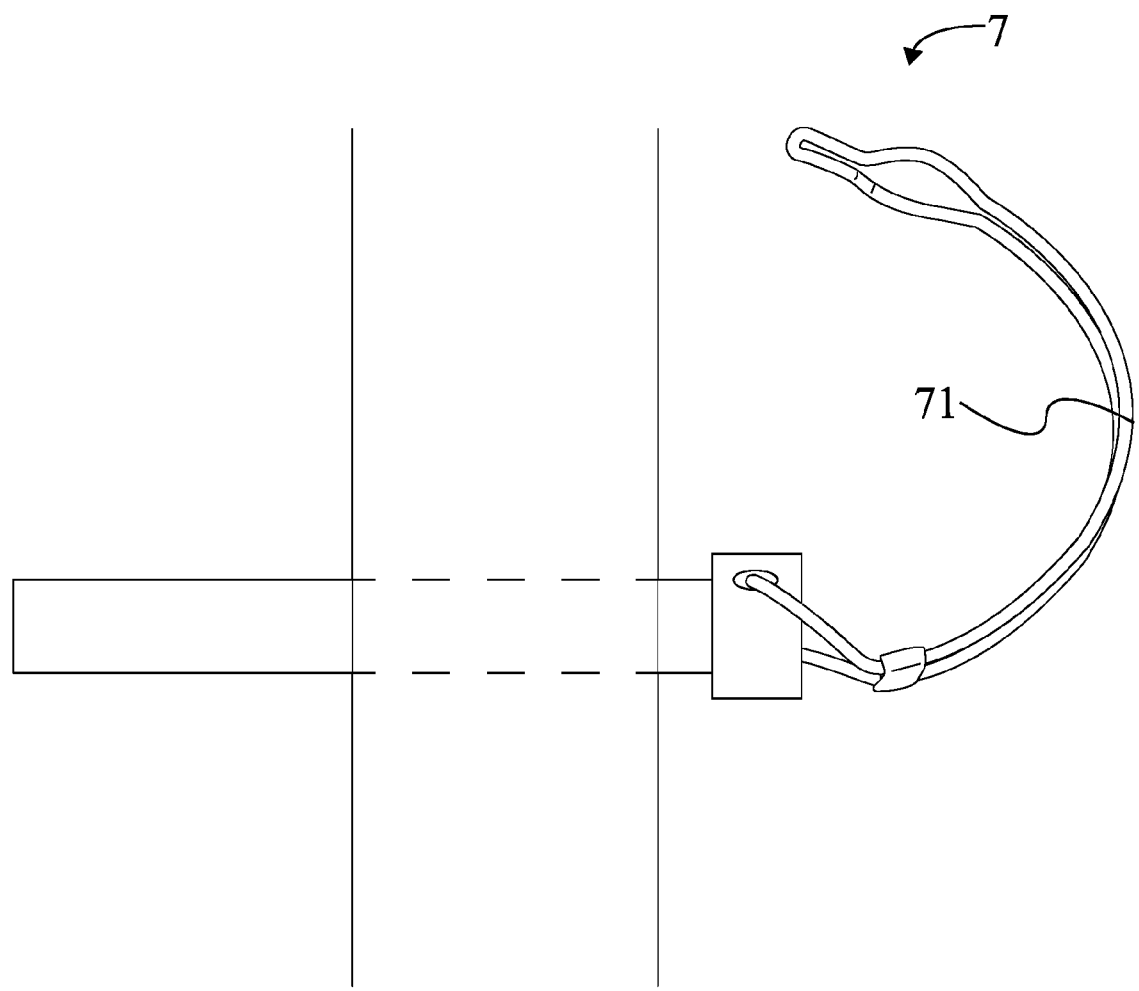
FIG. 19 is a front view showing a locking mechanism of the pin being disengaged from a lock receptacle of the post.
Figure 20:
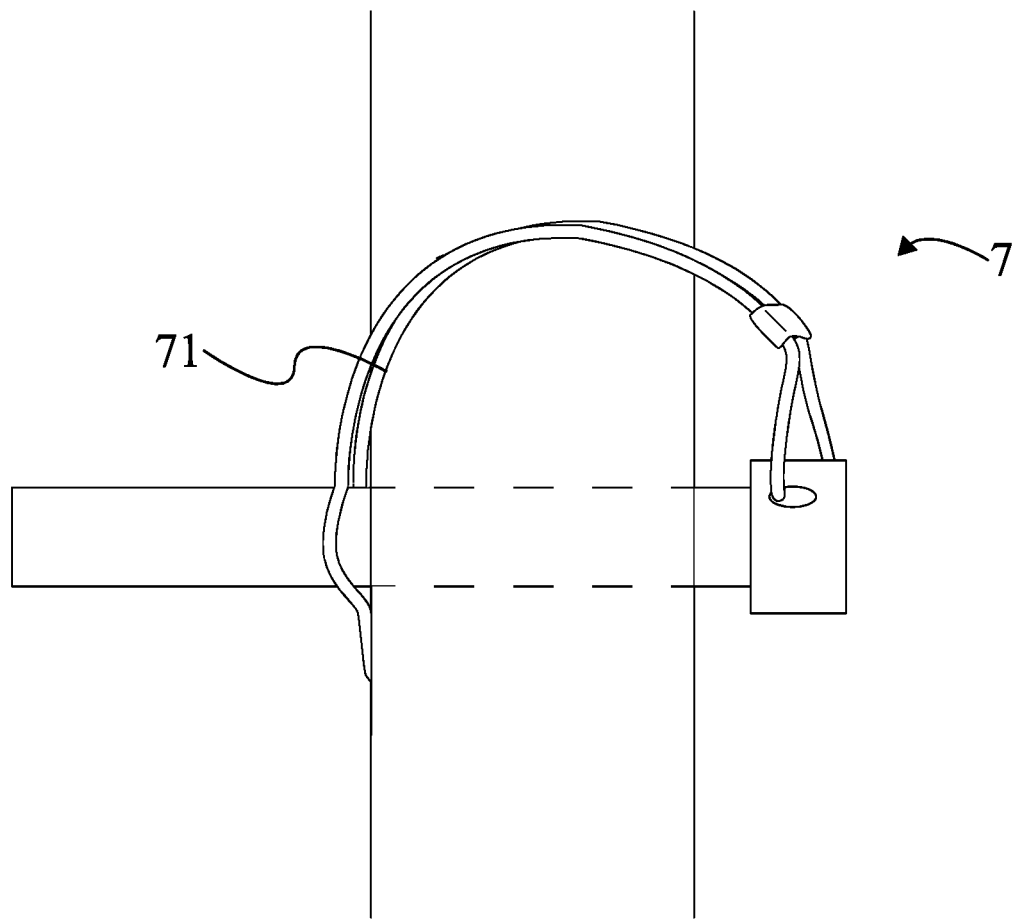
FIG. 20 is a front view showing the locking mechanism being engaged with the lock receptacle.

In another embodiment, to allow for the present invention to be quickly assembled or disassembled, a pin 7 is provided. The pin 7 is of the hinge type. The pin 7 has a head at one end, to which a locking member 71 is rotatably coupled. The locking member 71 is a U-shaped member which has elastic properties. As such, a user can extend the U-shaped member to allow a free end, with corresponding collar, to receive a free end of the pin 7. The free end of the pin 7 is opposite the head, and secures the pin 7 in place when engaged with the collar of the locking member 71. To receive the pin 7, the post 1 further comprises a first pin hole 15 while the hinge 3 further comprises a second pin hole 33. The first pin hole 15 and the second pin hole 33 receive the pin 7, which is thus able to rotatably join the post 1 and the hinge 3. Further, the second pin hole 33 serves to define the rotational axis 4 for the hinge 3. The pin 7 is inserted into the pin holes in order to couple the post 1 and the hinge 3. The pin 7 is slidably engaged with the first pin hole 15 and the second pin hole 33, allowing a user to easily insert and remove the pin 7 from the pin holes. The pin 7 is illustrated independently in FIG. 15-FIG. 17. The pin 7 is also shown in relation to the post 1 and hinge 3 through the exploded view shown in FIG. 18.

In some embodiments of the present invention, the pin 7 is a bolt, wherein one end of the pin 7 is threaded. Meanwhile, the locking mechanism 71 is a nut, or other threaded member, that is engaged with the threaded end of the pin 7 in order to secure the pin 7 to the post 1 and the hinge 3. The pin 7 being a threaded bolt provides an increased measure of security for connecting the hinge 3 to the post 1, as the hinge 3 cannot be removed from the post 1 without the use of tools to disengage the locking mechanism 71 from the pin 7. This is of particular benefit when adapting the present invention for public utilities in order to prevent theft or vandalism.

Figure 10:
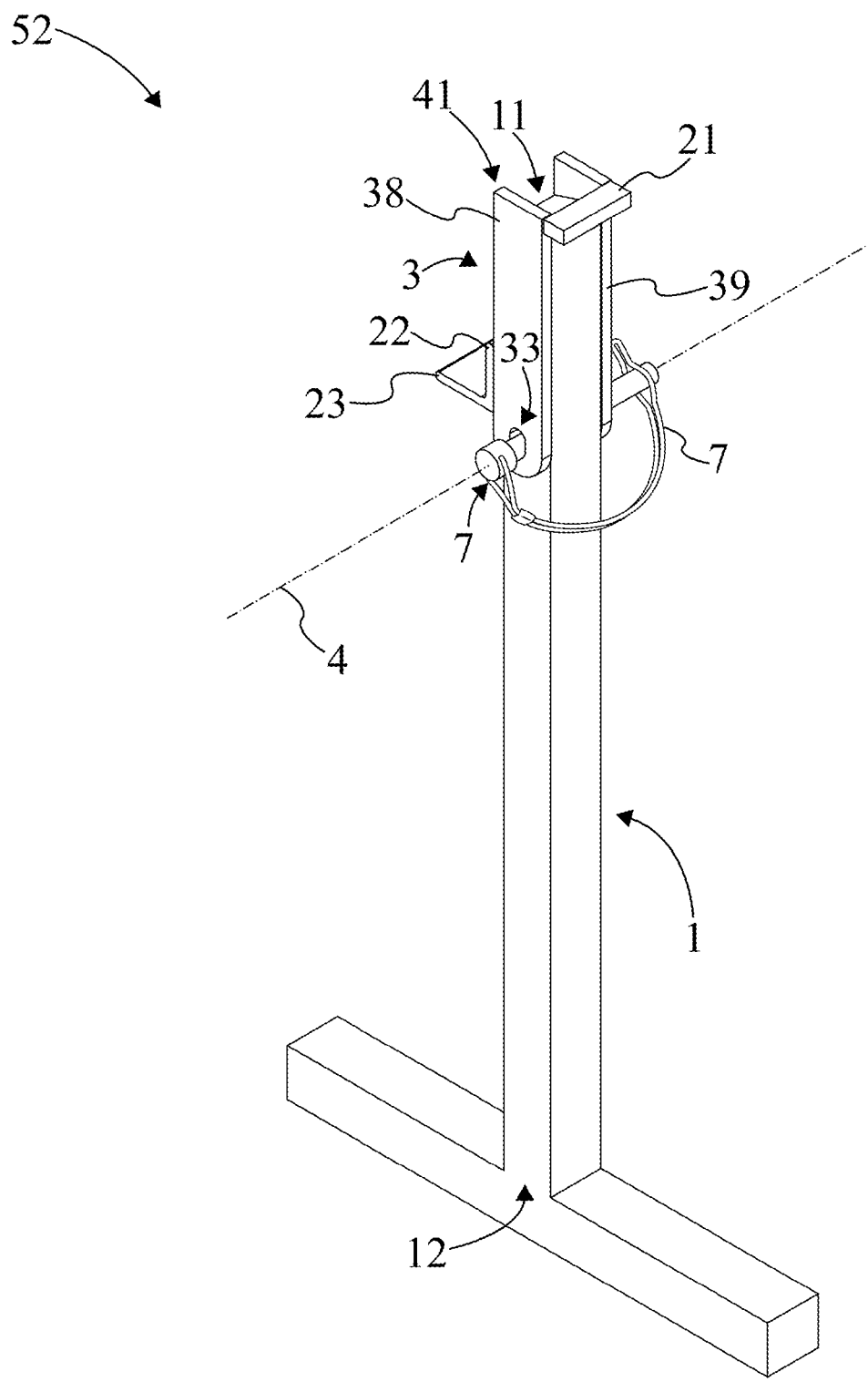
FIG. 10 is a perspective view showing the present invention in an unlocked configuration.
Figure 11:
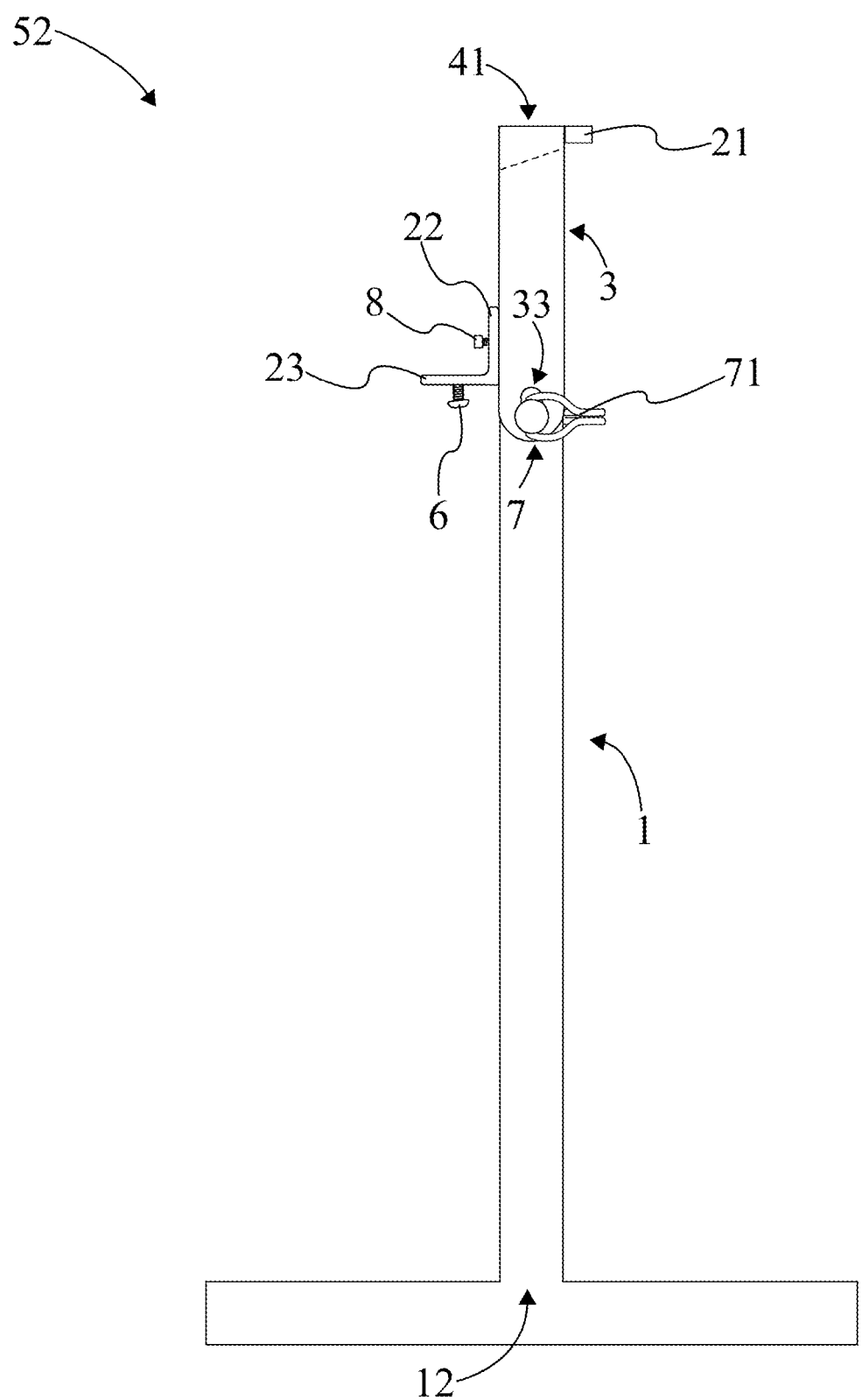
FIG. 11 is a front view showing the present invention in the unlocked configuration.
Figure 12:
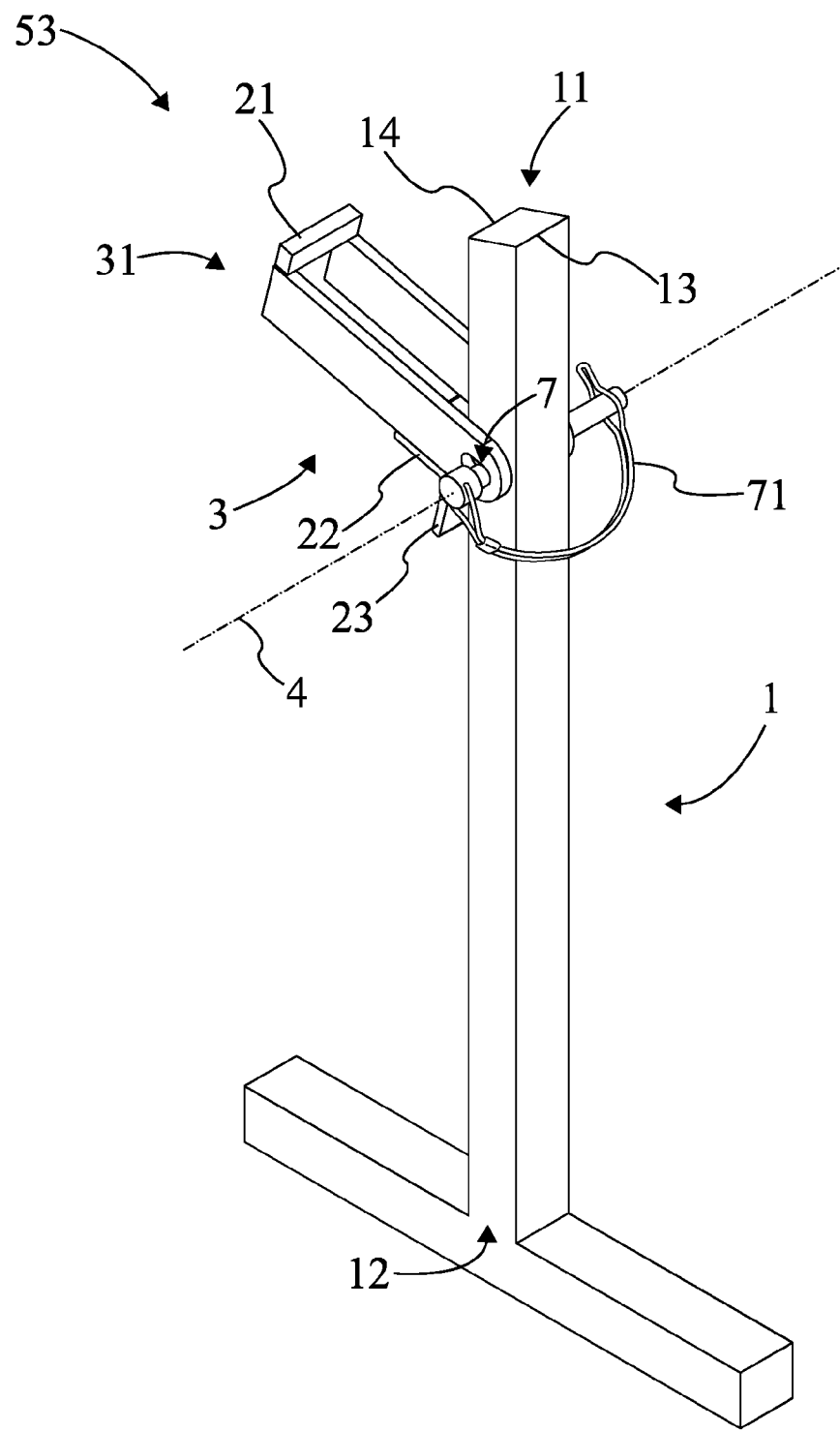
FIG. 12 is a perspective view showing the present invention in a collapsed configuration.
Figure 13:
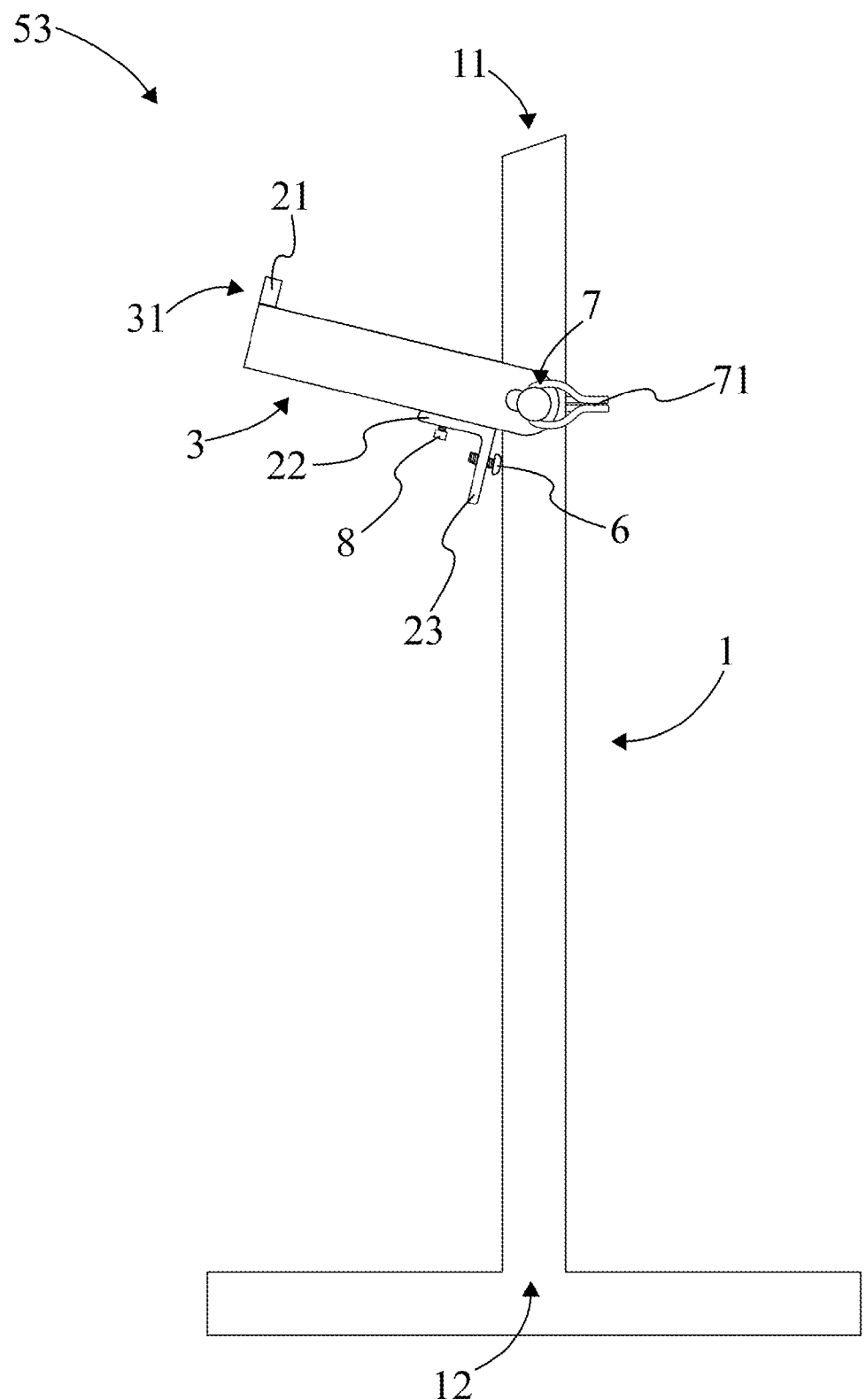
FIG. 13 is a front view showing a bracing member being used to offset an angle of the collapsed configuration.
Figure 14:
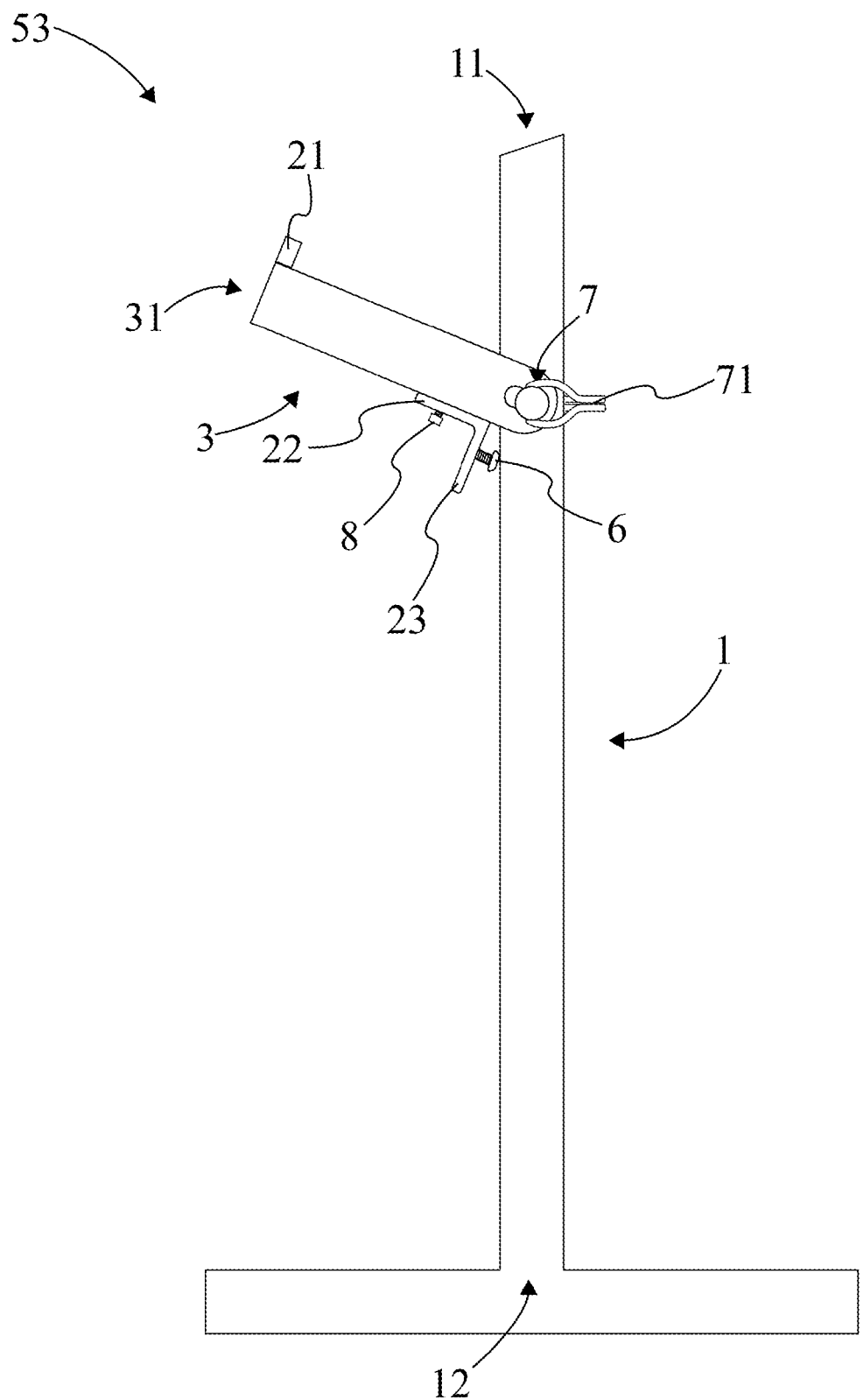
FIG. 14 is another front view showing the bracing member being used to offset the angle of the collapsed configuration.

Thanks to the pin 7, the present invention is not only easily switched between a locked configuration 51 as shown in FIG. 8-9, unlocked configuration 52 as shown in FIG. 10-11, and collapsed configuration 53 as shown in FIG. 12-14, it can easily be disassembled and reassembled. Several benefits are derived from this, for example the ability to more easily store the components of the present invention after disassembly.

The pin 7, as illustrated in the figures, is of a hinge-pin type. However, this does not preclude the use of different types of fasteners for rotatably joining the hinge and the post. For example, in one potential alternative embodiment, the pin 7 is of a T-lock type. Another possibility replaces the collar of the locking member 71 with a nut that is secured to a bolt (i.e. the pin 7), which prevents the elongated body from unintentionally sliding out of the pin holes. These are just a few examples of alternative means for rotatably joining the hinge 3 with the post 1; other means of doing so remain possible within the scope of the present invention.

In order for the pin holes to be compatible with the sliding engagement between the post 1 and the hinge 3, the second pin hole 33 preferably comprises a lower perimeter edge 34 and an upper perimeter edge 35. These perimeter edges are arch shaped, resulting in an oval shape with straight sides that join the curved lower perimeter edge 34 and upper perimeter edge 35. The straight sides allow the hinge 3 to be lifted, as necessary from the first stop 21 to clear the upper edge 13 of post 1. Meanwhile, a radius 72 of the pin 7 is equal to a radius 36 of the lower perimeter edge 34 and a radius 37 of the upper perimeter edge 35. Thus, the hinge 3 remains capable of rotating about the pin 7 regardless of the configuration (e.g. locked configuration 51, unlocked configuration 52, collapsed configuration 53, or other configuration). The lower perimeter edge 34 and the upper perimeter edge 35 are most clearly shown in FIG. 6.

The hinge 3 itself, as shown, comprises a first arm 38 and a second arm 39 that allows for a sleeved engagement with the post 1, as depicted in FIG. 8. The post 1 is positioned flush between the first arm 38 and the second arm 39, the first arm 38 and the second arm 39 being parallel with each other in order to snugly fit the post 1. This configuration results in the hinge 3 being capable of linear movement, as depicted between FIG. 8 and FIG. 10, and rotational movement relative to the post 1, as depicted between FIG. 10 and FIG. 12, as earlier described.

Further implantations remain possible with the present invention, being provided to improve upon the core concept of the present invention. An example of a potential improvement is the addition of fine-adjustment screws for tuning of the hinge 3. In reference to FIG. 9, a set screw 8 can be positioned through the second stop 22 and used to secure the hinge in an upright position. The set screw 8 is threaded through the second stop 22 and can be adjusted to engage with the post 1 to prevent any play of the hinge 3. If any play develops between the hinge 3 and the post 1, a user can tighten the set screw 8 in order to steady the hinge 3, or lock the hinge 3, in the upright position. By adjusting for play, a user ensures optimal operation of the present invention.

The properties of the present invention are useful in a number of applications, such as the table top and table bench originally described and as shown in FIG. 21-FIG. 24. In such an application, the fixed end 12 of the post 1 is mounted to a foot of the table, while a mounting plate connects the table top to the pivoting end 31 of the hinge 3. The bench is joined to the foot by a secondary post; a pin 7 secures the bench to the secondary post in order to allow for the bench to easily be separated from the secondary post. The coupling between the bench and the secondary post is similar to how the pin 7 is used to join the post 1 and the hinge 3 of the described embodiment. In this application, the present invention allows the table top (which moved with the hinge 3) to rotate relative to the table bench. In order to use the table top normally, a user places the present invention in the locked configuration 51 such that the table top is horizontally oriented. The table top can thus be used as, for example, an eating surface while persons sit on the bench.

Alternatively, a user could transition the present invention into the collapsed configuration 53 to use the table top as a back support in combination with the bench. The user even has the ability to adjust the incline of the table top relative to the bench by adjusting the bracing member 6 that is screwed into the third stop 23. Extending the bracing member 6 relative to the third stop 23 results in the post 1 contacting the bracing member 23 earlier. The earlier the post 1 contacts the bracing member 6, the greater the incline of the table top relative to the bench.

Preferably, in order to provide sufficient support for a rotating table as formerly described, multiple copies of the present invention are installed with the table. For example, as shown in FIG. 21-FIG. 24, two hinge mechanisms of the present invention are provided. One is at the left end of the table, while the other is at the right end of the table. As mentioned, this table is just one example implementation for the present invention and does not preclude use of the present invention with other apparatuses.

Although the invention has been explained in relation to its preferred embodiment, it is to be understood that many other possible modifications and variations can be made without departing from the spirit and scope of the invention as hereinafter claimed.

What is claimed is:
1. A hinge mechanism comprises:
a post;
a first stop;
a second stop;
a hinge;
the post comprises a beveled end and a fixed end;
the hinge comprises a pivoting end and a base end;
the beveled end comprises an upper edge and a lower edge;
the post being positioned into the hinge;

the pivoting end being rotatably mounted to the post, offset from the beveled end;
the pivoting end being slidably mounted along the post;
the first stop being positioned adjacent to the hinge;
the second stop being positioned adjacent to the hinge, opposite to the first stop;
the first stop being connected across the hinge, adjacent to the pivoting end;
the second stop being connected across the hinge, offset from the base end;
the upper edge and the lower edge being positioned opposite to each other across the beveled end; and
the upper edge and the lower edge being parallel to a rotational axis of the pivoting end.

2. The hinge mechanism as claimed in claim 1 comprises:
wherein the hinge and the post are in a locked configuration;
the lower edge being positioned adjacent to the second stop;
the post being laterally pressed against the second stop; and
the upper edge being pressed against the first stop.

3. The hinge mechanism as claimed in claim 1 comprises:
wherein the hinge and the post are in an unlocked configuration;
the lower edge being positioned adjacent to the second stop;
the post being laterally pressed against the second stop; and
the upper edge being positioned offset from the first stop.

4. The hinge mechanism as claimed in claim 1 comprises:
wherein the hinge and the post are in a collapsed configuration;
a third stop;
the third stop being connected perpendicular and adjacent to the second stop, opposite the hinge;
the post being laterally pressed against the third stop; and
the first stop being annularly offset from the upper edge about the pivoting end.

5. The hinge mechanism as claimed in claim 4 comprises:
a bracing member;
the bracing member being normal to the third stop;
the bracing member traversing through the third stop; and
the bracing member being threadibly engaged with the third stop.

6. The hinge mechanism as claimed in claim 1 comprises:
a pin;
a locking member;
the post further comprises a first pin hole;
the hinge further comprises a second pin hole;
the pin being slidably engaged with the first pin hole and the second pin hole; and
the locking member being engaged with the pin.

7. The hinge mechanism as claimed in claim 6 comprises:
the second pin hole comprises a lower perimeter edge and an upper perimeter edge;
the lower perimeter edge and the upper perimeter edge each being arc-shaped;
a radius of the pin being equal to a radius of the lower perimeter edge; and
the radius of the pin being equal to a radius of the upper perimeter edge.

8. The hinge mechanism as claimed in claim 1 comprises:
the hinge further comprises a first arm and a second arm;
the post being sleeved between the first arm and the second arm; and
the first arm and the second arm being parallel with each other.

* * * * *